F. E. JACKSON.
INTERNAL COMBUSTION ENGINE FOR AIR COMPRESSION PURPOSES.
APPLICATION FILED NOV. 21, 1910.
1,003,909.
Patented Sept. 19, 1911.
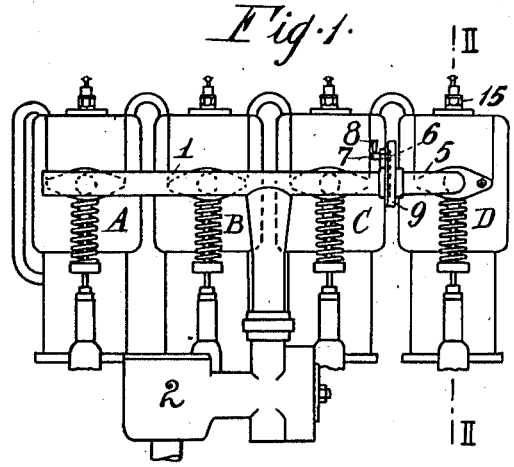
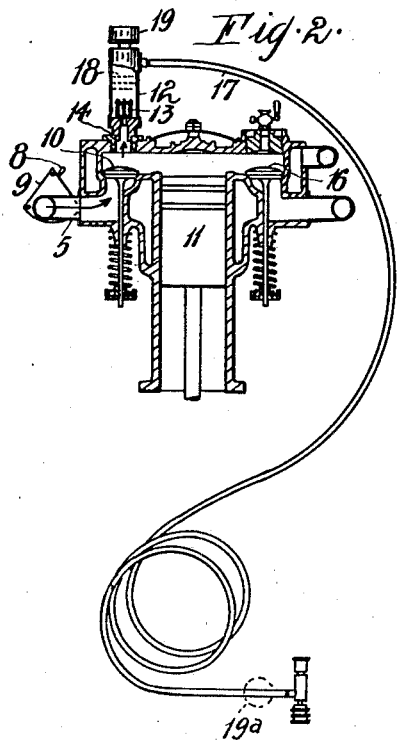
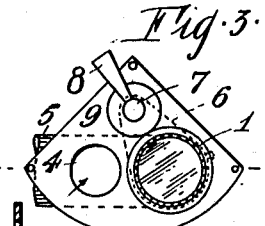
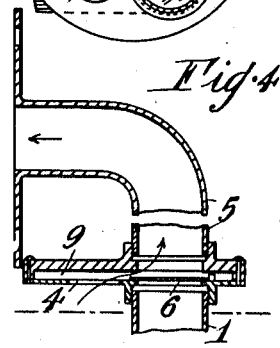
Witnesses:
Inventor
Fred Edward Jackson
by James L. Norris Jr.
Atty.

UNITED STATES PATENT OFFICE.

FRED EDWARD JACKSON, OF WILLIAMSTOWN, VICTORIA, AUSTRALIA.

INTERNAL-COMBUSTION ENGINE FOR AIR-COMPRESSION PURPOSES.

1,003,909.    Specification of Letters Patent.    Patented Sept. 19, 1911.

Application filed November 21, 1910. Serial No. 593,498.

*To all whom it may concern:*

Be it known that I, FRED EDWARD JACKSON, a subject of the King of Great Britain, residing at 343 Nelson Place, Williamstown, in the State of Victoria, Commonwealth of Australia, engineer, have invented an Internal-Combustion Engine for Air-Compression Purposes, of which the following is a specification.

This invention consists in the temporary employment of the compression strokes of one cylinder of a four-cycle multi-cylinder internal combustion engine of a motor car to compress air for inflating the tires of motor cars or for operating pneumatic jacks used therefor as well as for other useful purposes.

It is applicable to four-cycle engines containing two or more cylinders in any one of which the compression strokes of the piston thereof are used for the time being to compress air only by the aid of this invention.

The drawings comprise:—Figure 1 an elevation of part of a four-cycle four cylinder motor car petrol engine, Fig. 2 a transverse section on line II—II, Fig. 1 showing the improvements, Figs. 3 and 4, enlarged detail views showing the construction of a cut out valve, and Fig. 5 an enlarged section of a non-return valve both hereinafter described.

According to this invention the combustible mixture supply pipe 1, which delivers the combustible mixture from the carbureter 2 to each cylinder A, B, C, D, is adapted to be cut out of communication with one cylinder, (such as D) while at the same time air is admitted through a controllable port 4 to the cut-out portion 5 of said pipe or otherwise to the inlet valve 10 of such cylinder. Separate valves may be used to cut off the combustible mixture supply from this cylinder and to admit air thereto, but a duplex valve is preferable whereby the two operations are successively or almost simultaneously effected. A valve of this latter kind is shown in Figs. 3 and 4 and comprises a flat plate 6 mounted on a pivot 7 provided with a handle 8 and adapted to be oscillated in a valve chamber 9 connected with the combustible mixture supply pipe 1 so as to open the air port 4 formed in said chamber and cut off the supply from said pipe 1 to the cylinder D, as shown in Figs. 3 and 4. By this means when the inlet valve 10 of the cylinder D opens, the charge of air drawn in by the piston 11 through port 4 is delivered into said cylinder and subsequently compressed by the compression stroke of said piston. This compressed air is discharged through a non-return valve 13 and delivered into a receiver 12 in the end of which said valve 13 may be located. This receiver may be placed in any convenient position on and in communication with the upper part of the cylinder D or screwed into the sparking plug hole 14, from which the sparking plug 15, Fig. 1, has been previously temporarily removed, as shown in Fig. 2, and said receiver has sufficient capacity to receive approximately all the air which is compressed at each compression stroke of the piston. It will be obvious that this non-return valve 13 prevents the exhaustion of air from the receiver 12 when the exhaust valve 16 is opened.

The compressed air in the receiver is delivered through the usual hose pipe 17 to the tube of the tire to be inflated, or to where the power is required.

The compressed air receiver is preferably provided with an air filter or strainer of wire gauze 18 to obstruct any impurities in the air. A pressure gage 19 is placed on the receiver or on the hose where indicated by dotted lines 19ª and likewise a relief valve if required is placed on the receiver or hose.

It will be evident that by simply oscillating the valve plate 6 in the valve chamber 9, one cylinder is temporarily cut out of its usual work and its compression stroke is utilized to compress the air, which is discharged into the receiver from which it is delivered for any purpose, as for instance, to inflate tires of motor cars or operate pneumatic jacks used therefor.

Should it be desired provision may be made on more cylinders than one of the series for temporarily cutting out said cylinders and admitting air thereto for the purposes aforesaid.

Having fully described my invention, I claim:—

1. The combination, with a four-cycle, multi-cylinder internal combustion engine and a pipe common to the cylinders, for supplying the engine with gaseous fuel, of valve means interposed at a selected point in said pipe, and operable to cut off the communication of said pipe with a selected one of said cylinders and at the same time to establish atmospheric communication with the cylinder thus cut off from said pipe, and an air receiver adapted to be fitted to the cylinder thus cut off from said pipe and having a non-return valve.

2. The combination, with a four-cycle multi-cylinder internal combustion engine and a pipe common to the cylinders, for supplying the engine with gaseous fuel, of a casing interposed at a selected point in the pipe and provided with a port in communication with the atmosphere, a valve movably mounted in said casing and operable to cover said port and to clear the pipe, or to cover said port and to interrupt said pipe and thereby cut the same off from a selected cylinder and put said cylinder in communication with the atmosphere, the said port having a diameter approximately equal to the diameter of the usual inlet valve through which air admitted into the casing through said port passes, and an air receiver adapted to be fitted to the cylinder thus cut off from said pipe and having a non-return valve.

3. The combination with a multi-cylinder four cycle internal combustion engine wherein one cylinder is temporarily utilized for air compression purposes of an air receiver adapted to be fitted to the cylinder head and of sufficient capacity to receive approximately all the air which is compressed at each compression stroke of the piston of said cylinder, and a non-return valve provided at the inlet end of said air receiver and through which the compressed air is delivered from said piston.

In testimony whereof I have hereunto set my hand in presence of two subscribing witnesses.

FRED EDWARD JACKSON.

Witnesses:
EDWARD WATERS,
WILLIAM GUEST HOLDEN.